US008005745B1

(12) United States Patent
Cleaves et al.

(10) Patent No.: US 8,005,745 B1
(45) Date of Patent: Aug. 23, 2011

(54) SYSTEM AND METHOD FOR PROVIDING WORKUP TRADING WITHOUT EXCLUSIVE TRADING PRIVILEGES

(75) Inventors: Daniel Cleaves, Summit, NJ (US); Arthur Robert D'Arcy, Basking Ridge, NJ (US)

(73) Assignee: ICAP Services North America LLC, Jersey City, NJ (US)

( * ) Notice: Subject to any disclaimer, the term of this patent is extended or adjusted under 35 U.S.C. 154(b) by 105 days.

(21) Appl. No.: 11/475,975

(22) Filed: Jun. 28, 2006

(51) Int. Cl.
*G06Q 40/00* (2006.01)
(52) U.S. Cl. .......................................... 705/37; 705/35
(58) Field of Classification Search .............. 705/35–45; 713/86
See application file for complete search history.

(56) References Cited

U.S. PATENT DOCUMENTS

| | | | |
|---|---|---|---|
| 5,905,974 A | 5/1999 | Fraser et al. | |
| 6,560,580 B1 | 5/2003 | Fraser et al. | |
| 7,379,898 B2 | 5/2008 | Tenorio | |
| 7,383,220 B1 | 6/2008 | Keith | |
| 7,698,208 B2 | 4/2010 | Hirani et al. | |
| 2002/0091617 A1 | 7/2002 | Keith | |
| 2004/0034591 A1* | 2/2004 | Waelbroeck et al. | 705/37 |
| 2004/0210512 A1* | 10/2004 | Fraser et al. | 705/37 |
| 2005/0055304 A1* | 3/2005 | Lutnick et al. | 705/37 |
| 2005/0091142 A1* | 4/2005 | Renton et al. | 705/37 |
| 2005/0160032 A1 | 7/2005 | Lutnick et al. | |

FOREIGN PATENT DOCUMENTS

| | | |
|---|---|---|
| EP | 1256895 | 11/2002 |
| WO | WO-98/26363 | 6/1998 |
| WO | WO-00/38093 | 6/2000 |
| WO | WO-2007/082219 | 7/2007 |

OTHER PUBLICATIONS

Price Formation and Liquidity in the U.S. Treasury Market: The Response to Public Information; Michael J. Fleming and Eli M. Remolona; The Journal of Finance vol. 54, No. 5 (Oct. 1999), pp. 1901-1915.*
Liquidity Provision with Limit Orders and Strategic Specialist; Duane J. Seppi; The Review of Financial Studies; vol. 10, No. 1 (Spring, 1997), pp. 103-150.*
Kavajecz, Kenneth Andrew (1997). A specialist's quoted depth and the limit order book. Ph.D. dissertation, Northwestern University, United States—Illinois. Retrieved Jun. 2, 2011, from Dissertations & Theses.*
Jian Yao, "Market Making in the Interbank Foreign Exchange Market", JP Morgan Chase, web 1-5, pp. 1-69 (Nov. 2, 1997).

* cited by examiner

*Primary Examiner* — Hani M Kazimi
*Assistant Examiner* — Abhishek Vyas
(74) *Attorney, Agent, or Firm* — Dickstein Shapiro LLP

(57) ABSTRACT

A system and method are provided that preserve many of the advantages of traditional workups, including the ability to create a single deal extended in time, while avoiding aspects of prior art workup protocols that can be disadvantageous in particular trading environments and, particularly, avoiding the trading delays sometimes created by providing certain traders with exclusive trading privileges in highly-liquid, fast-moving trading environments. In a preferred embodiment, the present system comprises a distributed computer processing system programmed to provide a structured trading protocol that enhances trading efficiency and fairly distributes market opportunity to system users. More specifically, in a preferred embodiment, the present system is adapted to provide a plurality of workup phases each of which is designated a "public" phase and during which all trading is conducted on a first-come-first-served basis.

18 Claims, 4 Drawing Sheets

SYSTEM AND METHOD FOR PROVIDING WORKUP TRADING WITHOUT EXCLUSIVE TRADING PRIVILEGES

BACKGROUND OF THE INVENTION

In many markets, buy and sell orders at the same price are automatically matched. Thus, for example, a first order to buy an item at a price of 100 and a second order to sell the same item at a price of 100 will, in such markets, result in a transaction in which some quantity of the item is sold at the specified price.

But in some markets, most notably the secondary market for U.S. government treasuries, orders of equal price are not automatically matched. Rather, certain types of buy and sell orders, called "passive" orders, may co-exist at the same price without triggering a transaction. These passive orders do not trade unless "aggressed" against by a trader submitting a second type of order, called an "aggressive" order. Historically, a passive order to buy has been referred to as a "bid," while a passive order to sell has been referred to as an "offer." By contrast, an aggressive order to sell has been referred to as a "hit," while an aggressive order to buy has been referred to as a "take" or "lift."

This distinction between passive and aggressive orders is one of several characteristics of the secondary market in U.S. government treasuries that developed to encourage market liquidity. In particular, since it is impossible to generate liquidity in a market without having someone first make a price, inter-dealer brokers historically sought to encourage traders to submit bids and offers by not charging them a commission if their orders resulted in a trade. Thus, passive bids and offers could not be matched even at the same price since neither the passive buyer nor the passive seller would be required to pay a commission and the inter-dealer broker would not execute a transaction without a commission being paid.

In addition to commission-free trades, inter-dealer brokers in the secondary market for U.S. government treasuries also rewarded buyers and sellers by developing a number of trading protocols or conventions which granted certain buyers and sellers certain trading options or "rights." One such convention is commonly referred to as "workup." In general terms, this convention permits buyers and sellers to "work up" the size of a trade from the quantity traded as a result of an initial "hit" or "lift." Historically, certain traders, including the first aggressive-side and passive-side traders, were granted an option or right to increase their size, and to trade that additional size ahead of other traders.

Conceptually, a workup is considered a single deal extended in time. This conception was reflected historically in several interesting aspects of workup trading. For example, because all trading during workup was considered part of a single deal, all such trading occurred at a single price point set by the initial hit or lift that triggered the workup. In addition, the initial aggressor's side of the market (i.e., the sell side in the case of a hit and the buy side in the case of a lift) was designated the "aggressive" side of the market for the duration of the workup. Similarly, the opposite side of the market was designated the "passive" side of the market for the entire workup. This designation played an important role in trading, including determining which entities would pay commission, historically paid only by the aggressive side of the market.

As electronic trading developed, electronic platforms were developed that provided for automated workup functionality. One such electronic platform is the BrokerTec® electronic trading platform operated by ICAP Electronic Broking which first included a workup functionality in May 2001. As originally launched, the BrokerTec workup functionality included two distinct phases, a private phase and a public phase. During the private phase, an aggressor that bought or sold all displayed volume at the best available price was granted an exclusive right to trade additional volume for the duration of the private phase. If the aggressor failed to buy or sell all displayed volume at the best available price, no exclusive trading privileges were granted on the aggressive side of the market, and all traders on that side of the market traded on a first-come-first-served basis even during the private phase. On the passive side of the market, the first position bidder or offeror that was hit or lifted was granted exclusive trading privileges for the duration of the private phase.

The private phase in the BrokerTec electronic trading platform automatically expired after a fixed, non-extendable number of seconds tracked by a timer. Upon expiration of the private phase, the public phase commenced. During the public phase, all trading on both sides of the market was conducted on a first-come-first-served basis. The duration of the public phase was also controlled by a timer. But unlike the private-phase timer, the public-phase timer was reset each time a new execution occurred during the workup. Thus, expiration of the public-phase timer indicated a sustained period of trading inactivity and caused the system to end the workup.

The BrokerTec electronic trading platform includes three types of aggressive orders: fill or kill (FoK), fill and store (FaS), and fill and kill (FaK). Generally speaking, a FoK order is executed only if it can be completely filled. Thus, for example, if a trader submits a FoK order to buy $10M of a particular security at par and only $8M of that security is available at that price, no trade occurs and the order is "killed," i.e., not entered in the order book.

By contrast, FaK and FaS orders may be partially filled. When a FaS order is partially filled, the unfilled portion of the order is automatically converted to a new order for the unfilled size on what is called the "follow," i.e., the period following completion of the trade. Thus, if a trader submits a FaS order to buy $10M of a particular security at par and only $8M of that security is available at that price, $8M of the order is filled, and the unfilled portion of the order is converted into a new passive order to buy $2M of the specified security at par.

When a FaK order is partially filled, the unfilled portion of the order is "killed" and does not result in an order for the unfilled size on the follow. Thus, if a trader submits a FaK order to buy $10M of a particular security at par and only $8M of that security is available at that price, $8M of the order is filled, and the order's unfilled portion is "killed."

SUMMARY OF THE INVENTION

A system and method are provided that preserve many of the advantages of traditional workups, including the ability to create a single deal extended in time, while avoiding aspects of prior art workup protocols that can be disadvantageous in particular trading environments and, particularly, avoiding the trading delays sometimes created by providing certain traders with exclusive trading privileges in highly-liquid, fast-moving trading environments.

In a preferred embodiment, the present system comprises a distributed computer processing system programmed to provide a structured trading protocol that enhances trading efficiency and fairly distributes market opportunity to system users. More specifically, in a preferred embodiment, the present system is adapted to provide a plurality of workup phases each of which is designated a "public" phase and during which all trading is conducted on a first-come-first-served basis.

The first public phase preferably commences upon the occurrence of a hit or a lift and terminates upon: (1) the occurrence of a second trade execution; or (2) expiration of a non-extendable first-public-phase timer, whichever comes first. The second public phase preferably commences upon termination of the first public phase and terminates upon expiration of an extendable second-public-phase timer. The second-public-phase timer is reset each time that a trade execution occurs during the second public phase. In a preferred embodiment, the first public-phase-timer is set for a higher number of seconds than the second public-phase-timer, thus permitting a guaranteed duration to the workup that is longer than the extensions to the workup triggered by each subsequent trade execution.

DETAILED DESCRIPTION OF THE INVENTION

Figure 1:
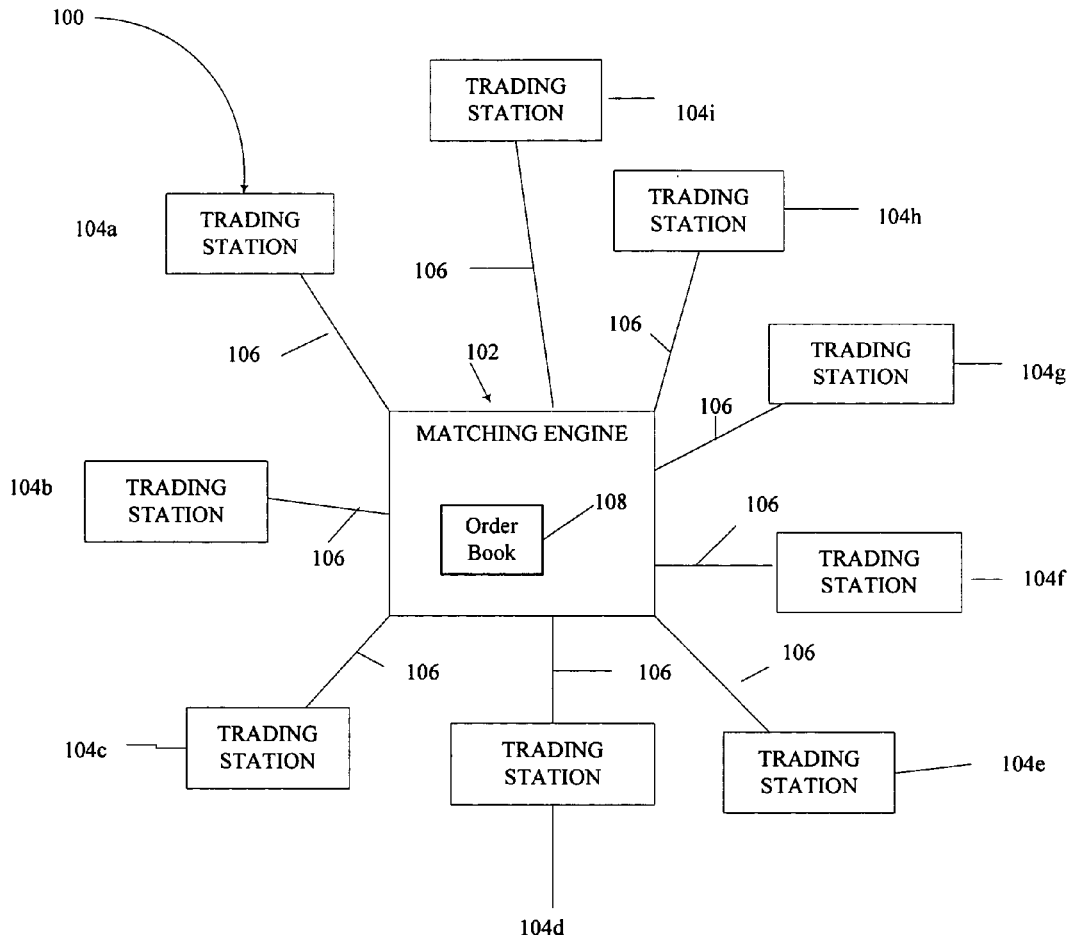
FIG. 1 is a block diagram depicting aspects of a preferred embodiment of the present system.

With reference to FIG. 1, there is shown a system 100 comprising a matching engine 102 and a plurality of customer terminals 104 connected via appropriate communication links 106. Matching engine 102 is preferably adapted to receive orders to buy and sell securities from terminals 104, to process trading orders in accordance with specified protocols, and to communicate market information concerning trading activity to terminals 104, as described in more detail below.

Matching engine 102 preferably comprises one or more server computers and associated components programmed to implement the trading activity described below. As further shown in FIG. 1, matching engine 102 preferably maintains an order book 108 that stores orders received by matching engine 102 from terminals 104, as described in more detail below.

Each terminal 104 may preferably be a computer workstation comprising a CPU, memory, a display, and input devices, such as a mouse, keyboard, or specialized trading keypad. Terminals 104 may be provided to customers for direct entry of buy and sell orders on their own behalf, or to brokers for entry of such orders on behalf of others. Communication links 106 may comprise any appropriate arrangement of wired or wireless communication lines or networks, such as the Internet or dedicated communication lines.

Figure 2A:
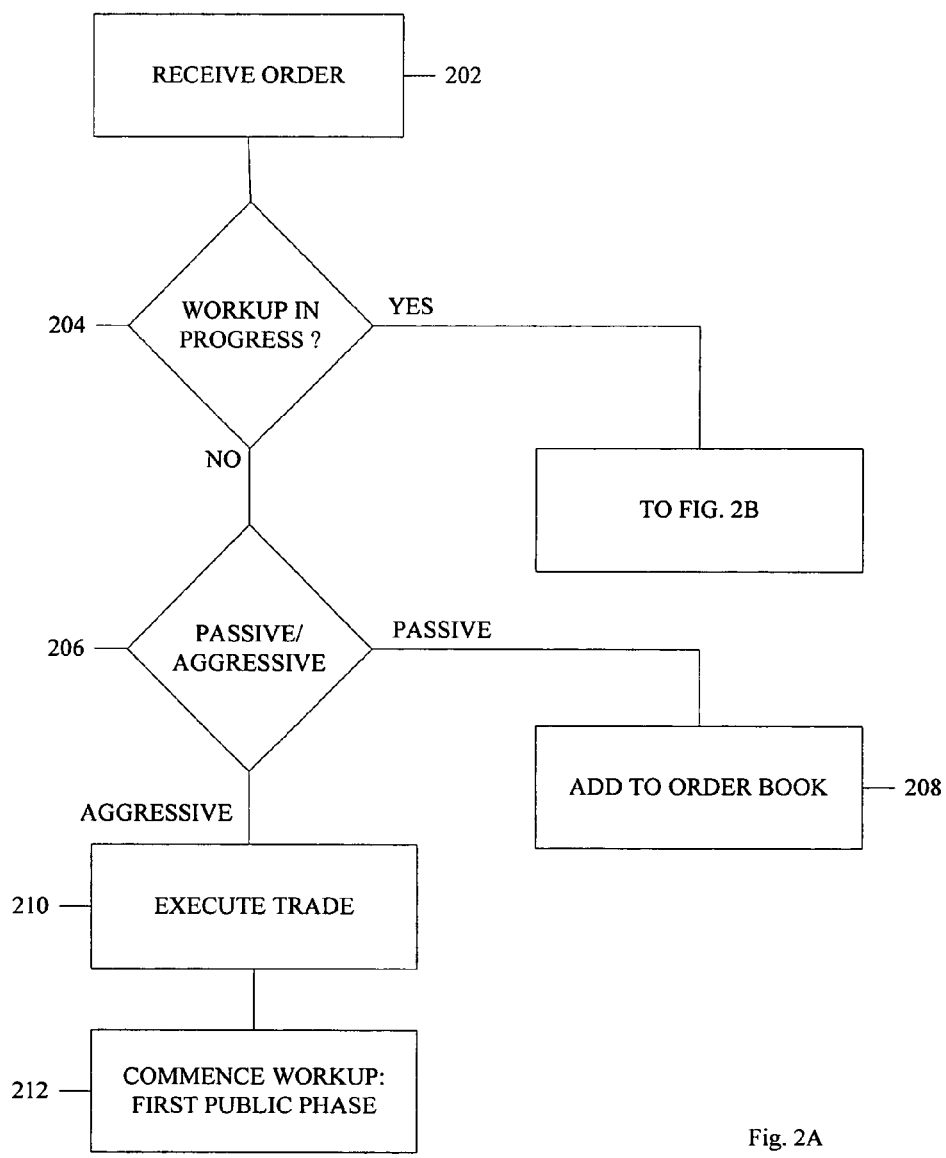
FIGS. 2A-C are flow diagrams illustrating aspects of system operation in processing a received order in a preferred embodiment.
Figure 2B:
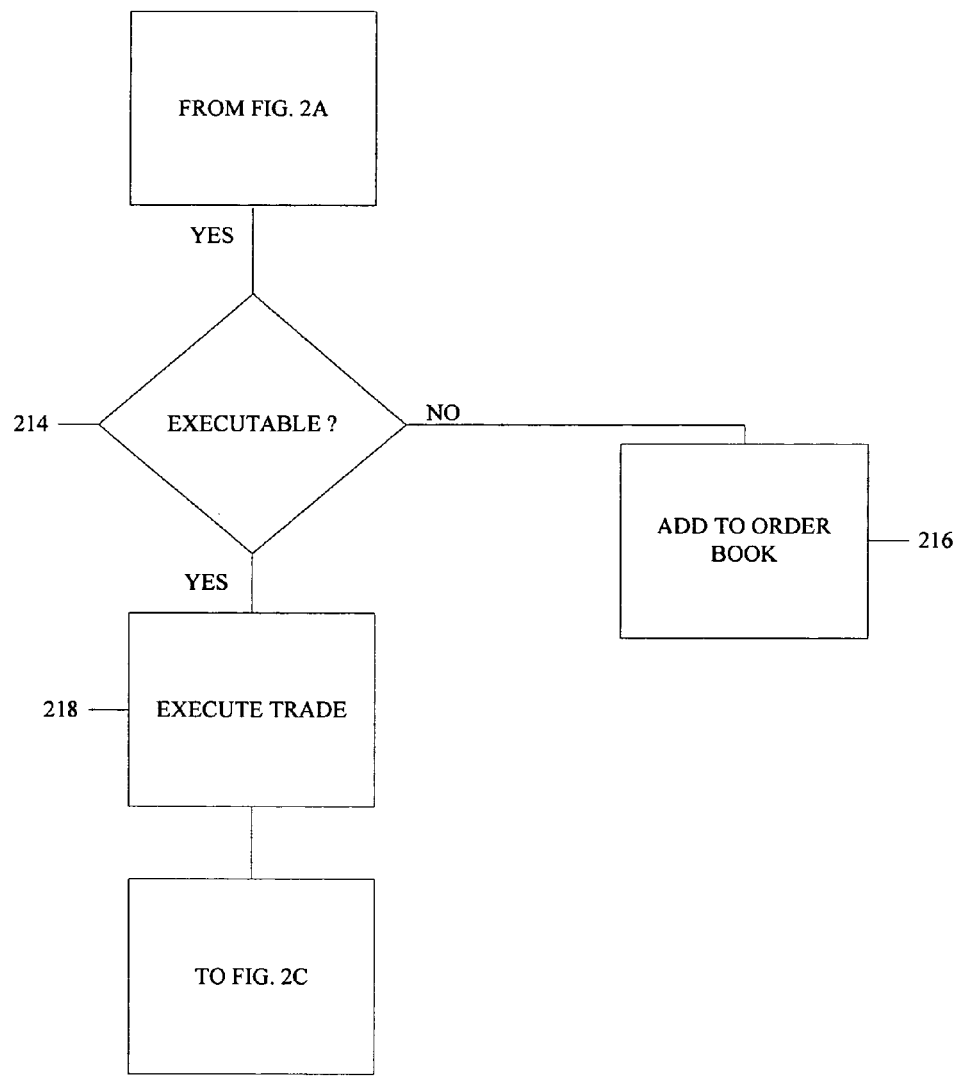
Figure 2C:
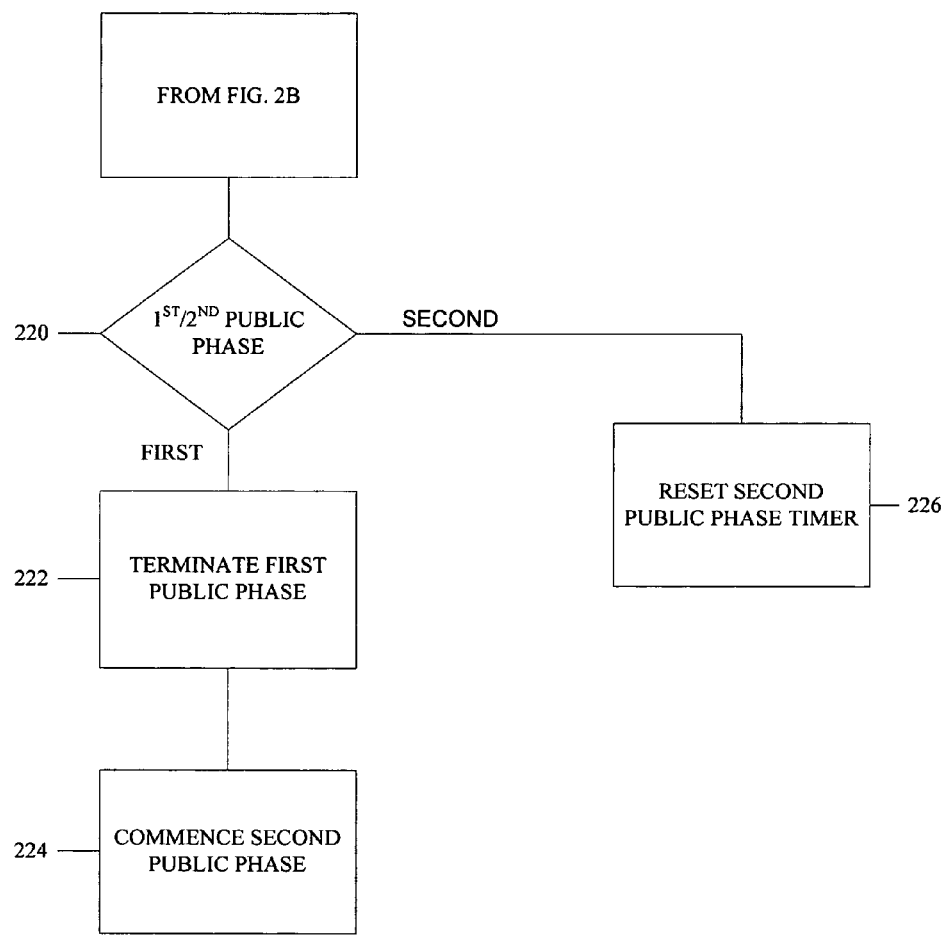

One preferred embodiment for processing trade orders in accordance with the present invention will now be described in connection with FIGS. 2A-C. In step 202, matching engine 102 receives an order to buy securities from a customer or broker entered via a terminal 104. In step 204, matching engine 102 determines whether there is a workup in progress. If there is a workup in progress (step 204, Yes), processing proceeds to step 214, described below.

If a workup is not in progress (step 204, No), processing proceeds to step 206, where matching engine 102 determines whether the order is a passive order (i.e., a bid or an offer) or an aggressive order (i.e., a hit or take). If the order is a passive order (step 206, Passive), processing proceeds to step 208 where the passive order is added to the order book and published to the marketplace for display at trader terminals 104 (step 208).

Otherwise, if the order is an aggressive order (step 206, Aggressive), processing proceeds to step 210 where the aggressive order is executed by matching it against one or more pending passive orders on the opposite side of order book 108. In step 212, a workup commences with a first public workup phase during which all trading is conducted on a first-come-first-served basis at the price specified by the initial transaction that triggered the workup, referred to hereafter as the workup price. More specifically, during the first public phase, only orders at the workup price are executed. Furthermore, orders at that price on both the aggressive and passive sides of the markets are matched on pure time priority and no exclusive rights are granted to either the aggressor that initiated the workup or any passive side traders hit or lifted by the aggressor.

Preferably, a workup is triggered whether the initial aggressive order is for all or any part of the shown size on the opposite side of the market. In addition, where the system comprises a hidden size feature allowing traders to display to the market less than all the size they have entered, all shown sizes trade before any hidden size and the hidden size of the first position buyer or seller on the passive side of the market take priority over the rest of the stack. Thus, for example, where the first passive side trader has a bid at a shown size of 5 mm showing and 25 mm hidden size and the second passive trader has a bid at a size of 10 mm showing and zero hidden, if an aggressor hits for 10 mm, the first buyer will buy 5 mm, the second buyer will buy 5 mm, a workup will commence, and the first buyer's size will be replenished from his or her hidden size and remain at the head of the queue. Any other additional shown or hidden size entered following commencement of the workup will be matched on pure price-time priority.

Commencement of the first public phase preferably comprises commencement of a non-extendable first-public-phase timer. The first public phase continues until this fixed timer expires or until a second transaction occurs during the workup, as described in more detail below.

Returning to step 204, it will be recalled that matching engine 102 determined whether or not a workup is in progress in processing the incoming order. If a workup is in progress (step 204, Yes), processing proceeds to step 214 where it is determined whether the order is able to cause an execution. More specifically, if the order comes in on the aggressive side of the market (as determined by the side of the market to which the aggressor that initiated the workup belonged), the system determines whether there is unexecuted volume available on the passive side of the market with which the new aggressive-side order may be matched. Similarly, if the order comes in on the passive side of the market, the system determines whether there is unexecuted volume available on the aggressive side of the market with which the new passive-side order may be matched. It will be noted, that as long as contraparty volume is available when an order is received during this first workup phase, a trade execution will occur since all trading is conducted in this phase on a first-come-first-served basis with no exclusive trading privileges. Thus, a trade execution will occur regardless of which trader submitted the order.

If the newly received order does not result in an execution because there is no contraparty volume available, processing proceeds to step 216 where the order is added to the order book to be held for potential subsequent matching during later stages in the workup. Notably, this is preferably true even if the submitted order is a FaK order since the workup is a single deal extended in time and such orders therefore may be filled at any time before the workup concludes. Otherwise, if the newly received order is one that does enable an execution, processing proceeds to step 218 where the order is executed.

In a preferred embodiment, FoK orders are not permitted during a workup. In addition, it should further be noted that, in a preferred embodiment, if the submitted order is a passive order at a price worse than the workup price it is entered in the order book by the system based on its time and price priority; if the submitted order is an aggressive order at a price worse than the workup price it is stored in the order book as a passive order if it was a FaS aggressive order, and otherwise killed; if the submitted order is a passive order at a price better than the workup price it is rejected. In addition, where a trader submits an aggressive order at a price better than the workup price it is preferably re-priced to the workup price for the duration of the workup and treated as an aggressive order entered at the workup price. After the workup concludes, where such order was entered by a human trader, it is kept at the workup price and the unexecuted portion is either stored, in the case of a FaS order, or killed in the case of a FaK order. Where such order was submitted by a non-human trader (e.g., an automated order generator), the price of the order is returned to the original submission price after the workup concludes, and the unexecuted portion of the order is treated as an aggressive order at the submitted price. Passive orders at the workup price from traders on the aggressive side of the market are preferably rejected. Passive orders at the workup price from traders on the passive side of the market are preferably matched to the extent possible.

In step 220, matching engine 102 determines whether the workup is currently in the first public phase or the second public phase. If the workup is currently in the first public phase (step 220, First), processing proceeds to step 222 where the first public phase is terminated and then to step 224 where the second public phase is commenced. Commencement of the second public phase preferably comprises commencement of a second-public-phase timer. The second public phase extends until this second-public-phase timer expires, as described below.

By contrast, if the workup is in the second public phase (step 220, Second), processing proceeds to step 226 where the second-public-phase timer is reset thus extending the second public phase for at least the duration of that second-public-phase timer. In a preferred embodiment, the first public-phase-timer is set for a higher number of seconds than the second public-phase-timer, thus permitting a guaranteed duration to the workup that is longer than the extensions to the workup triggered by each subsequent trade execution.

When a first public-phase timer or a second public-phase-timer expires, the workup is preferably terminated and the order book is prepared for the follow, i.e., the passive market of bids and offers following conclusion of the workup. The system may preferably be adapted to implement any appropriate set of rules for establishing the follow. One preferred embodiment, however, for a system that accepts FaK, FoK, and FaS orders will now be described by way of illustration. In particular, once a workup concludes, any remaining unexecuted portions of a FaK order are preferably killed and not retained in the order book on the follow. By contrast, any remaining portion of a FaS order is retained as a passive order in the order book on the follow. Similarly, any remaining portions of passive bids or offers are retained in the order book on the follow. Any desired implementation may be selected to implement the timer functionality described above. For example, the system may be adapted to periodically poll any running timer to determine if it has expired or be implemented such that expiration of a timer causes an interrupt that drives further processing in accordance with the process described above.

While the present invention has been described in conjunction with specific embodiments, it is evident that numerous alternatives, modifications, and variations will be apparent to those skilled in the art in view of the foregoing description.

The invention claimed is:

1. A computerized trading system for trading an item, comprising;
   a server computer configured to match orders to buy and sell the item received from one or more of a plurality of distributed computerized trading terminals in response to receipt of said orders to buy and sell the item;
   the server computer being further configured to:
   receive a passive order to buy or sell the item submitted by a first trader from a first computerized trading terminal, the passive order specifying at least a quantity and a price for the item;
   receive an aggressive order to hit or lift the passive order submitted by a second trader from a second computerized trading terminal, the aggressive order specifying at least a quantity for the item;
   in response to receipt of the passive order and the aggressive order, execute a first transaction wherein the first trader buys or sells a quantity of the item specified in the aggressive order at the price specified in the passive order;
   enter a public work-up on execution of the first transaction, the public work-up comprising:
   the server computer receiving additional orders to buy and sell the item from other traders, the additional orders sent from computerized trading terminals of the other traders; and
   in response to receipt of the additional orders, the server computer executing additional transactions involving orders received from the other traders at the price specified in the passive order without providing any trader exclusive trading privileges.

2. The computerized trading system of claim 1, wherein the server computer is configured to receive the additional orders and execute the additional transactions in two phases.

3. The computerized trading system of claim 2, further comprising a first timer, wherein the first phase commences upon execution of the first transaction and concludes upon the earlier of expiration of the first timer or execution of an additional transaction.

4. The computerized trading system of claim 3, comprising a second timer, wherein the second phase commences upon termination of the first phase and concludes upon the expiration of the second timer.

5. The computerized trading system of claim 4, wherein the second timer is reset each time an additional transaction is executed.

6. The computerized trading system of claim 5, wherein the first timer is set to a higher number of seconds than the second timer.

7. A computerized trading method for trading an item utilizing a computerized trading system, comprising:
   receiving, at a server computer configured to match orders to buy and sell the item in response to receipt of said orders to buy and sell the item, a passive order to buy or sell the item submitted by a first trader from a first computerized trader terminal, the passive order specifying at least a quantity and a price for the item;

receiving at the server computer an aggressive order to hit or lift the passive order submitted by a second trader from a second computerized trading terminal, the aggressive order specifying at least a quantity for the item;

in response to receipt of the passive order and the aggressive order, executing by the server computer a first transaction wherein the first trader buys or sells a quantity of the item specified in the aggressive order at the price specified in the passive order;

entering a public work-up on execution of the first transaction, the public work-up comprising:

receiving at the server computer additional orders to buy and sell the item from other traders the orders being sent from computerized trading terminals of the other traders; and in response to receipt of the additional orders, executing at the server computer additional transactions involving the other traders at the price specified in the passive order without providing any trader exclusive trading privileges.

8. The computerized method of claim 7, wherein the server computer is configured to receive the additional orders and execute the additional transactions in two phases.

9. The computerized method of claim 8, wherein the first phase commences upon execution of the first transaction and concludes upon the earlier of expiration of a first timer or execution of an additional transaction.

10. The computerized method of claim 9, wherein the second phase commences upon termination of the first phase and concludes upon the expiration of a second timer.

11. The computerized method of claim 10, wherein the second timer is reset each time an additional transaction is executed.

12. The computerized method of claim 11, wherein the first timer is set to a higher number of seconds than the second timer.

13. A computerized method for trading an item on an electronic trading system, comprising:

receiving at a server computer configured to match orders to buy and sell the item in response to receipt of said orders to buy and sell the item, a passive order to buy or sell the item submitted by a first trader, from a first computerized trading terminal, the passive order specifying at least a quantity and a price for the item;

receiving at the server computer an aggressive order to hit or lift the passive order submitted by a second trader from a second computerized trading terminal, the aggressive order specifying at least a quantity for the item;

in response to receipt of the passive order and the aggressive order, executing by the server computer a first transaction wherein the first trader buys or sells a quantity of the item specified in the aggressive order at the price specified in the passive order;

entering a public work-up on execution of the first transaction, the public work-up comprising:

receiving additional orders to buy and sell the item from traders including traders other than the first and second traders from respective computerized trading terminals;

in response to receipt of the additional orders, executing by the server computer the additional transaction involving the other traders at the price specified in the passive order without providing any trader exclusive trading privileges, wherein the public work-up comprises a first work-up phase which concludes on expiry of a predetermined time period or an execution of the addition transaction, whichever occurs first.

14. The computerized trading method according to claim 13, comprising initiating by the server computer a second public work-up phase on execution of an additional transaction, said second phase concluding a predetermined time after initiation.

15. The computerized trading method according to claim 14, comprising re-initiating by the server computer the second public work-up phase each time a further additional transaction is executed during the second public work-up phase.

16. An electronic trading system for trading items comprising:

a server computer configured to operate as a matching engine for matching orders to buy and sell the item received from one or more of a plurality of computerized trading terminals in response to receipt of said orders to buy and sell the item;

the matching engine being configured to:

receive via a communication link a passive order to buy or sell the item submitted by a first trader from a first computerized trading terminal, the passive order specifying at least a quantity and a price for the item;

receive via a communication link an aggressive order to hit or lift the passive order submitted by a second trader from a second computerized trading terminal, the aggressive order specifying at least a quantity for the item;

in response to receipt of the passive order and the aggressive order, execute a first transaction wherein the first trader buys or sells a quantity of the item specified in the aggressive order at the price specified in the passive order;

enter a public work-up on execution of the first transaction, the public work-up comprising:

receiving via communication links additional orders to buy and sell the item from traders including traders other than the first and second traders, the additional orders being received from respective computerized trading terminals of the traders;

in response to receipt of the additional orders, executing the additional transaction involving the other traders at the price specified in the passive order without providing any trader exclusive trading privileges, wherein the public work-up further comprises a first work-up phase which concludes on expiry of a predetermined time period determined by a timer of the server computer or an execution of the addition transaction, whichever occurs first.

17. The electronic trading system according to claim 16, wherein the server computer is configured to initiate a second public work-up phase on execution of an additional transaction, said second phase concluding a predetermined time period determined by a second timer of the server computer after initiation.

18. The electronic trading system according to claim 17, wherein the server computer is configured to re-initiate the second public work-up phase each time a further additional transaction is executed during the second public work-up phase.

* * * * *